US011938993B2

(12) United States Patent
Guo

(10) Patent No.: US 11,938,993 B2
(45) Date of Patent: Mar. 26, 2024

(54) PULL STRAP AND CHILD SUPPORTER HAVING THE SAME

(71) Applicant: CHINA WONDERLAND NURSERYGOODS CO., LTD., Guangdong (CN)

(72) Inventor: Zhengwen Guo, Guangdong (CN)

(73) Assignee: China Wonderland Nurserygoods Co., Ltd., Guangdong (CN)

(*) Notice: Subject to any disclaimer, the term of this patent is extended or adjusted under 35 U.S.C. 154(b) by 110 days.

(21) Appl. No.: 17/442,974

(22) PCT Filed: Sep. 17, 2019

(86) PCT No.: PCT/CN2019/106180
§ 371 (c)(1),
(2) Date: Sep. 24, 2021

(87) PCT Pub. No.: WO2020/192037
PCT Pub. Date: Oct. 1, 2020

(65) Prior Publication Data
US 2022/0185355 A1 Jun. 16, 2022

(30) Foreign Application Priority Data

Mar. 25, 2019 (CN) .......................... 201920388040.6

(51) Int. Cl.
B62B 7/06 (2006.01)
(52) U.S. Cl.
CPC ...................... B62B 7/06 (2013.01)
(58) Field of Classification Search
CPC ................ B62B 7/06; B62B 7/14; B62B 9/20
See application file for complete search history.

(56) References Cited

U.S. PATENT DOCUMENTS 2,443,191 A   6/1948  Miller
8,985,616 B1*  3/2015  Chen ....................... B62B 7/062
                                                       280/47.38

(Continued)

FOREIGN PATENT DOCUMENTS

CN    201758662 U     3/2011
CN    201997040 U  * 10/2011
(Continued)

OTHER PUBLICATIONS

Mechanical translation of CN-201997040-U, Oct. 2011.*

(Continued)

Primary Examiner — John D Walters
(74) Attorney, Agent, or Firm — Volpe Koenig

(57) ABSTRACT

A pull strap (100) and a child supporter (200) having same; a frame (201) is provided thereon with a folding mechanism (203) that facilitates the folding of the frame; the pull strap is used for folding the frame of the child supporter; and the pull strap comprises a non-elastic belt (10) and an elastic belt (20) which are linkedly provided; an end portion of the non-elastic belt is connected to the folding mechanism, or end portions of the non-elastic belt and the elastic belt are connected to the folding mechanism; the pull strap is operated to deform the elastic belt, so that the non-elastic belt drives the folding mechanism to act, thereby causing the frame to fold. The pull strap and the child supporter provided with the pull strap are simple in structure and convenient to operate; in addition, manufacturing costs are effectively reduced.

17 Claims, 4 Drawing Sheets

(56) References Cited

U.S. PATENT DOCUMENTS

| | | | | |
|---|---|---|---|---|
| 9,561,816 B2* | 2/2017 | Dowd | ................. | B62B 7/08 |
| 11,155,292 B2* | 10/2021 | Duan | ................. | B62B 7/08 |
| 2012/0181828 A1 | 7/2012 | Cheng | | |
| 2015/0008659 A1* | 1/2015 | Chang | ................. | B62B 7/062 |
| | | | | 280/650 |

FOREIGN PATENT DOCUMENTS

| | | | | |
|---|---|---|---|---|
| CN | 201997040 U | 10/2011 | | |
| CN | 203483625 U | 3/2014 | | |
| CN | 204050940 U | 12/2014 | | |
| CN | 108209325 A | 6/2018 | | |
| CN | 109305210 A | 2/2019 | | |
| EP | 3002175 A1 * | 4/2016 | ............ | B62B 7/062 |
| EP | 3434556 A1 * | 1/2019 | ........... | A47D 13/025 |
| JP | 2014034347 A * | 2/2014 | | |

OTHER PUBLICATIONS

International Search Report dated Dec. 26, 2019 for International Patent Application No. PCT/CN2019/050184. (English Translation Provided).

Written Opinion dated Dec. 26, 2019 for International Patent Application No. PCT/CN2019/106180.

* cited by examiner

PULL STRAP AND CHILD SUPPORTER HAVING THE SAME

CROSS-REFERENCE TO RELATED APPLICATIONS

This application is a 371 U.S. National Phase of International Patent Application No. PCT/CN2019/106180, filed on Sep. 17, 2019, which is based on and claims priority to Chinese Patent Application No. 201920388040.6, filed on Mar. 25, 2019, the entire contents of which are incorporated herein by reference.

TECHNICAL FIELD

The present application relates to the field of a child supporter, in particular to a pull strap and a child supporter having the pull strap.

BACKGROUND

With increasing progress of society and economy as well as increasing improvement of science and technology, consumer goods provided for people are increasingly abundant, thereby creating extremely excellent material conditions for improving people's living standard, and a child supporter involves in those plenty of consumer goods. When parents take their children out for shopping or walking, they usually use a child supporter with wheels instead of hand holding to reduce their burden. Moreover, the child supporter also has an advantage of comfortable and safe riding, and therefore, it is more and more popular.

In order to facilitate carrying and storage, some child supporters can be folded, however, the existing folding mechanism for folding the child supporter is relatively complex in structure, high in cost and inconvenient to use, thereby affecting the use effect of the child supporters.

Therefore, there is an urgent need for a pull strap and a child supporter with the pull strap, which have a simple structure and are convenient to use so as to overcome the above-mentioned problems.

SUMMARY

An object of the present application is to provide a pull strap which is simple in structure, convenient to operate and low in cost, and can be folded by a folding mechanism, thereby improving the convenience of using the child supporter.

Another object of the present application is to provide a child supporter which is provided thereon with a pull strap, and the pull strap is simple in structure, convenient to operate and low in cost and can be folded by a folding mechanism, so as to improve the convenience of using the child supporter.

In order to achieve the above purposes, the present application provides a pull strap for folding a frame of a child supporter. The frame is provided thereon with a folding mechanism that facilitates the folding of the frame. The pull strap includes a non-elastic belt and an elastic belt which are linkedly provided, and an end portion of the non-elastic belt is connected to the folding mechanism, and the pull strap is operated to deform the elastic belt, so that the non-elastic belt drives the folding mechanism to act, thereby realizing the folding of the frame.

Preferably, the non-elastic belt and the elastic belt are correspondingly provided one by one.

Preferably, the pull strap includes at least two non-elastic belts and at least one elastic belt, and one elastic belt is connected between every two of the non-elastic belts.

Preferably, the non-elastic belt is completely or partially wrapped in the elastic belt and has a receiving length shorter than a natural length of the non-elastic belt, and the non-elastic belt may drive the folding mechanism to act when the non-elastic belt is restored from the receiving length to the natural length.

Preferably, the non-elastic belt is in a strip profile, the elastic belt is in a cylinder profile, and the non-elastic belt is configured to penetrate through the elastic belt in a clearance fit.

Preferably, the non-elastic belt has at least one receiving portion wrapped in the elastic belt.

Preferably, a relatively middle section of the non-elastic belt penetrates through one elastic belt in a curved profile and has one receiving portion, and both ends of the elastic belt are flush with both ends of the receiving portion.

Preferably, both ends of the elastic belt and both ends of the receiving portion may be sewn as one piece.

Preferably, relatively front and rear sections of the non-elastic belt are placed in and penetrate through the corresponding two elastic belts in a curved profile and have two receiving portions, and two ends of the two elastic belts may be respectively flush with two ends of the corresponding receiving portions.

The present application also provides another pull strap for folding a frame of the child supporter. The frame is provided thereon with a folding mechanism that facilitates the folding of the frame. The pull strap includes a non-elastic belt and an elastic belt which are linkedly provided, and end portions of the non-elastic belt and the elastic belt are connected to the folding mechanism. The pull strap is operated to deform the elastic belt, so that the non-elastic belt drives the folding mechanism to act, thus realizing the folding of the frame.

Preferably, the non-elastic belt is completely or partially wrapped in the elastic belt and has a receiving length shorter than a natural length of the non-elastic belt, and the non-elastic belt may drive the folding mechanism to act when the non-elastic belt is restored from the receiving length to the natural length.

Preferably, the non-elastic belt is in strip profile, the elastic belt is in a cylinder profile, and the non-elastic belt is configured to penetrate through the elastic belt in a clearance fit.

Preferably, the non-elastic belt has at least one receiving portion wrapped in the elastic belt.

Preferably, the non-elastic belt completely penetrates through one elastic belt in a curved profile and has one receiving portion, a natural length of the elastic belt is shorter than the natural length of the non-elastic belt, and both ends of the non-elastic belt are flush with both ends of the elastic belt.

Preferably, both ends of the non-elastic belt and both ends of the elastic belt may be sewn as one piece.

Preferably, relatively front and rear sections of the non-elastic belt are placed in and penetrate through two corresponding elastic belts and have two receiving portions, both ends of one of the elastic belts may be respectively flush with a leading end of the non-elastic belt and a tailing end of the corresponding receiving portion, and both ends of another elastic belt may be respectively flush with a leading end of the corresponding receiving portion and a tailing end of the non-elastic belt.

The present application also provides a child supporter including a frame, a seat detachably connected to the frame, a basket connected to the frame, a folding mechanism connected to the frame and a pull strap connected to the folding mechanism, wherein the pull strap is as described above.

Compared with the prior art, the pull strap of the present application includes a non-elastic belt and an elastic belt which are linkedly provided, and an end portion of the non-elastic belt is connected to the folding mechanism, or end portions of the non-elastic belt and the elastic end are connected to the folding mechanism, the pull strap is operated to deform the elastic belt, so that the non-elastic belt drives the folding mechanism to act, thereby realizing the folding of the vehicle frame. When the pull strap is loosed, the elastic belt resets and the entire pull strap resets to be in a short state, and the elastic belt and the non-elastic belt are linkedly cooperated so that a length of the pull strap is not too long, thus effectively avoiding the problem that the use is affected due to that the pull strap is too long to fall into a basket, drag to the ground or be twisted into wheels.

DETAILED DESCRIPTION

The following description will be made in detail in conjunction with the embodiments and the accompanying drawings to explain technical contents, structural features, achieved objectives and effects of the present application.

Figure 1:
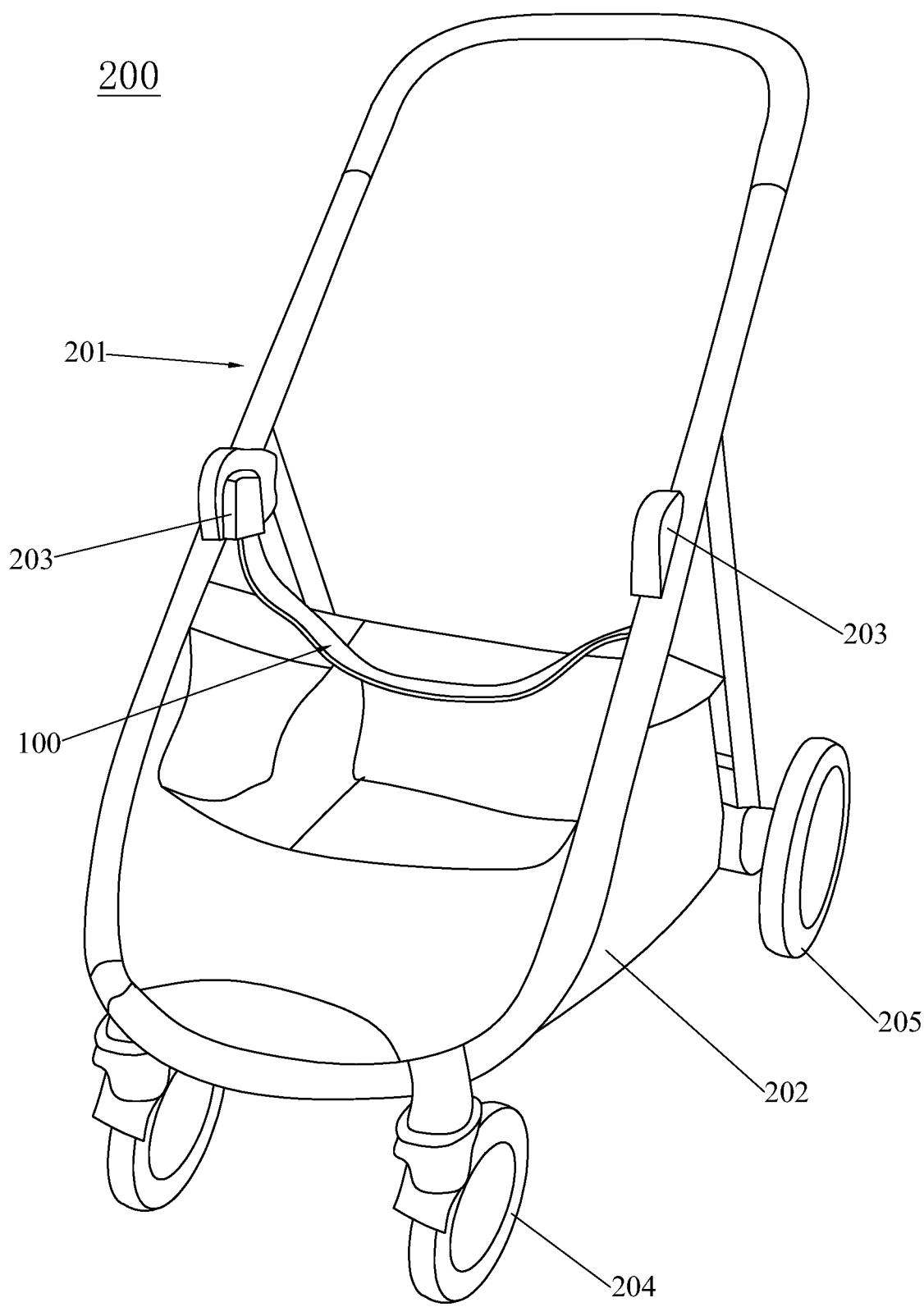
FIG. 1 is a schematic structural view of a child supporter according to the present application.

Referring to FIG. 1, the present application discloses a pull strap 100 and a child supporter 200 with the pull strap 100. The child supporter 200 includes, but is not limited to, for example, a stroller, a carrycot, a baby bed, a baby cradle, a safety seat, etc. Specifically, in a preferred embodiment of the present application, the child supporter 200 disclosed in the present application is a stroller, which includes a frame 201, a seat (not shown) detachably connected to the frame 201, a basket 202 connected to the frame 201 and located below the seat, a folding mechanism 203 connected to the frame 201 and a pull strap 100 connected to the folding mechanism 203. End portions of the pull strap 100 are clamped, hung, wound, or sleeved into the folding mechanism 203. Of course, at least one front wheel 204 and rear wheels 205 are also connected to front and rear side ends of the frame 201. The pull strap 100 may be operated to drive the folding mechanism 203 to act, thereby realizing the folding of the frame 201.

Referring to FIG. 2 to FIG. 6, the pull strap 100 according to the preferred embodiment of the present application includes a non-elastic belt 10 and an elastic belt 20 which are linkedly provided, and an end portion of the non-elastic belt 10 are coupled to the folding mechanism 203, or end portions of the non-elastic belt 10 and the elastic belt 20 are coupled to the folding mechanism 203. The pull strap 100 is operated to deform the elastic belt 20, so that the non-elastic belt 10 drives the folding mechanism 203 to act, thereby causing the folding of the frame 201. Specifically, the non-elastic belt 10 may be a cotton rope, woven belt or flannelette with a certain length and without elasticity, and the elastic belt 20 may be an elastic band, elastic rope or elastic flannelette with a certain length.

Figure 2:
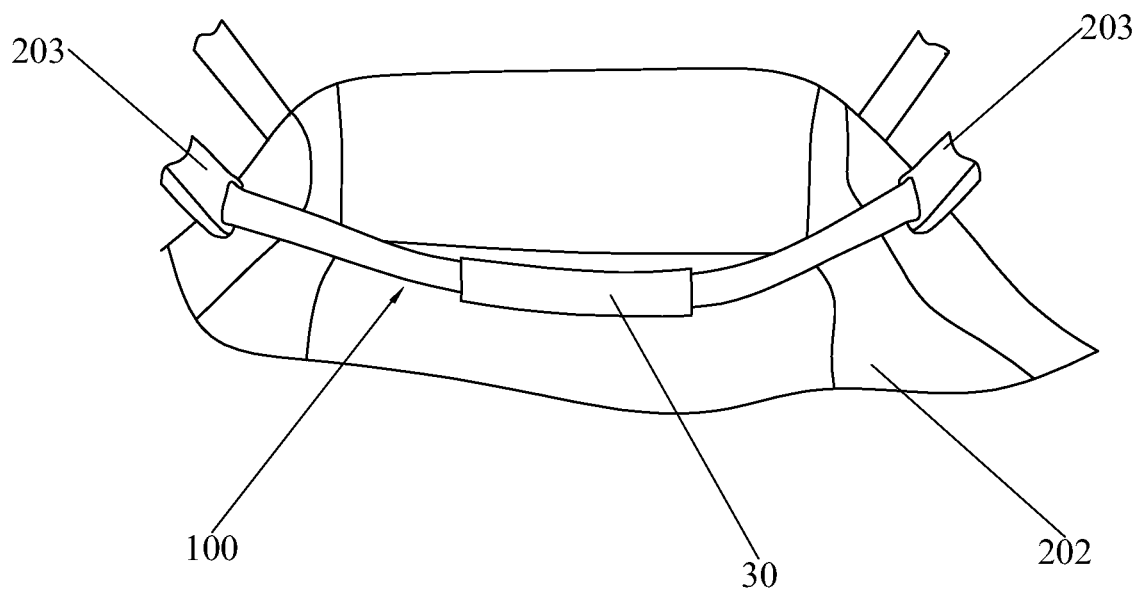
FIG. 2 is a schematic view of a pull strap placed on a child supporter according to the present application.

Referring to FIG. 2, when each of two opposite sides of the frame 201 is provided with a folding mechanism 203, a leading and trailing ends of a pull strap 200 are respectively connected to the folding mechanism 203. For convenience of operation, the pull strap 100 of the present application further includes an operating member 30 that is sleeved on the elastic belt 20, and the elastic belt 20 may be conveniently pulled by manually operating the operating member 30. The operating member 30 is in a cylinder profile, specifically is a piece of cloth detachably wrapped on the elastic belt 20, and has a width larger than a width of the elastic member 20.

Referring to FIG. 3 to FIG. 6, in the preferred embodiment of the present application, the non-elastic belt 10 may be completely or partially wrapped in the elastic belt 20 and have at least one receiving portion 11. In this case, the non-elastic belt 10 may be in strip profile, while the elastic belt 20 is in a cylinder profile. The non-elastic belt 10 is configured to penetrate through the elastic belt 20 in a clearance fit. Since the non-elastic belt 10 is completely or partially wrapped in the elastic belt 20, it has a receiving length shorter than a natural length of the non-elastic belt 10 as a whole. When the elastic belt 20 is deformed to make the non-elastic belt 10 to be restored from the receiving length to the natural length, the folding mechanism 203 may be driven to act. Of course, the non-elastic belt 10 may not be wrapped in the elastic belt 20, but may be directly connected to the elastic belt 20, preferably by sewing. In this case, both the non-elastic belt 10 and the elastic belt 20 may be strip profile. The non-elastic belt 10 and the elastic belt 20 may be correspondingly provided one by one, however, it is possible that the pull strap 100 includes at least two non-elastic belts 10 and at least one elastic belt 20, and one elastic belt 20 is connected between every two non-elastic belts 10, that is, the non-elastic belt 10 and the elastic belt 20 are not correspondingly provided one by one. Specifically, according to a combination relationship between the non-elastic belt 10 and the elastic belt 20, the pull strap 100 includes at least the structures as below.

Figure 3:
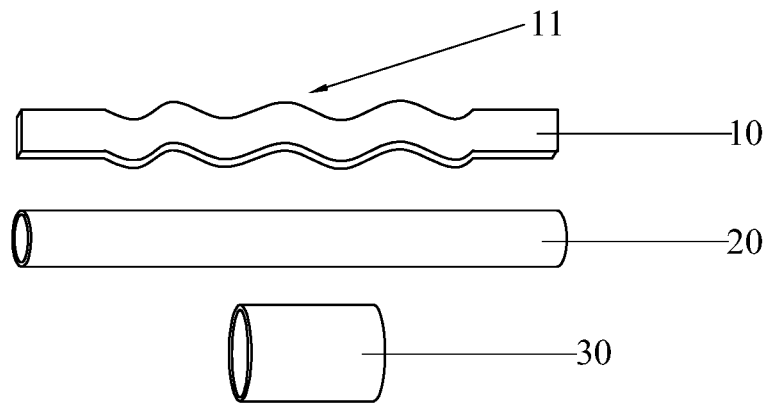
FIG. 3 is an exploded schematic view of a pull strap with a structure according to a first embodiment of the present application.

Referring to FIG. 3, the structure of the pull strap 100 according to a first embodiment of the present application is presented as follows: a non-elastic belt 10 completely penetrates through an elastic belt 20 in a curved profile and has a receiving portion 11, a natural length of the elastic belt 20 is shorter than a natural length of the non-elastic belt 10, and both ends of the non-elastic belt 10 are flush with both ends of the elastic belt 20. An operating member 30 may be located at a center position of the elastic belt 20, so that forces on both ends of the non-elastic belt 10 are balanced, so as to facilitate the synchronous operation of two folding mechanisms 203. Preferably, the both ends of the non-elastic belt 10 and the both ends of the elastic belt 20 may be sewn as one piece.

Figure 4:
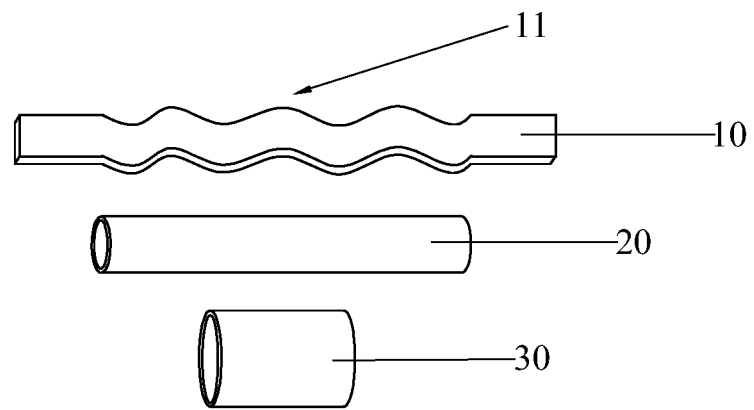
FIG. 4 is an exploded schematic view of a pull strap with a structure according to a second embodiment of the present application.

Referring to FIG. 4, the structure of the pull strap 100 according to a second embodiment is presented as follows:

a relatively middle section of the non-elastic belt 10 penetrates through an elastic belt 20 in a curved profile and has a receiving portion 11, and both ends of the elastic belt 20 are flush with both ends of the receiving portion 11, and the both ends of the elastic belt 20 and the both ends of the receiving portion 11 may be sewn as one piece, while the operating member 30 is still located at the center position of the elastic belt 20.

Figure 5:
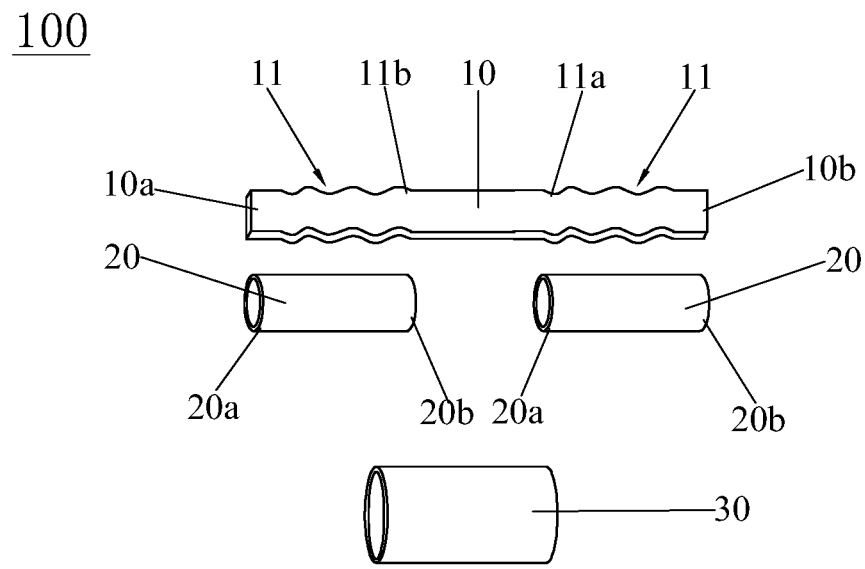
FIG. 5 is an exploded schematic view of a pull strap with a structure according to a third embodiment of the present application.

Referring to FIG. 5, the structure of the pull strap 100 according to a third embodiment of the present application is different from the first structure in that, the non-elastic belt 10 is provided thereon with two elastic belts 20. Specifically, relatively front and rear sections of the non-elastic belt 10 are configured to penetrate through corresponding two elastic belts 20 in a curved profile and have two receiving portions 11, and both ends of each of the two elastic belts 20 may be flush with both ends of the corresponding receiving portion 11. At this time, the operating member 30 is located at a symmetrical center of the two elastic belts 20, and both ends of the operating member 30 are sleeved on the two elastic belts 20. Of course, the both ends of one of the elastic belts 20 may be respectively flush with a leading end 10 $a$ of the non-elastic belt 10 and a tailing end 11 $b$ of a corresponding receiving portion 11, while the both ends of the other one of the elastic belts 20 may be respectively flush with a leading end 11 $a$ of another receiving portion 11 and a tailing end 10 $b$ of the non-elastic belt 10. The both ends of the elastic belt 20 and the both ends of the corresponding receiving portion 11 may be sewn as one piece, or a leading end 20 $a$ of an elastic belt 20 and the leading end 10 $a$ of the non-elastic belt 10 may be sewn as one piece, while a tailing end 20 $b$ of the elastic belt 20 and a tailing end 11 $b$ of the corresponding receiving portion 11 are sewn as one piece. The leading end 20 $a$ of another elastic belt 20 and the leading end 11 $a$ are sewn as one piece, and the tailing end 20 $b$ of the elastic belt 20 and the tailing end 10 $b$ are sewn as one piece.

Figure 6:
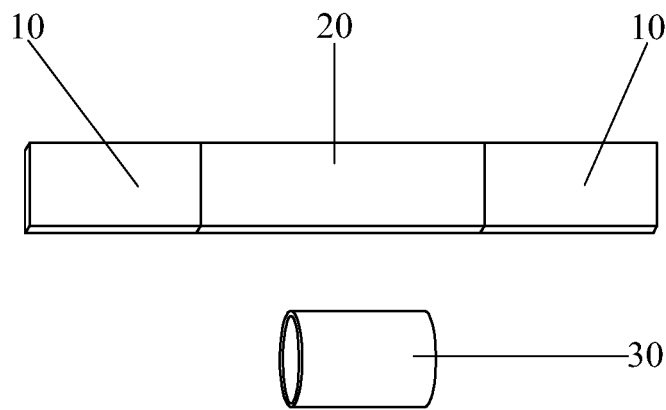
FIG. 6 is an exploded schematic view of a pull strap with a structure according to a fourth embodiment of the present application.

Referring to FIG. 6, the structure of the pull strap 100 according to a fourth embodiment of the present application is different from its first structure in that, the non-elastic belt 10 is not wrapped in the elastic belt 20, but is directly connected to the elastic belt 20. Specifically, one elastic belt 20 is connected between two non-elastic belts 10, and the operating member 30 may be sleeved at the center of the elastic belt 20.

Compared with the prior art, the pull strap 100 in the present application includes a non-elastic belt 10 and an elastic belt 20 which are linkedly provided, and an end portion of the non-elastic belt 20 is connected to the folding mechanism 203, or end portions of the non-elastic portion 10 and the elastic belt 20 are connected to the folding mechanism 203, the pull strap 100 is operated to stretch and deform the elastic belt 100, so that the non-elastic belt 10 may drive the folding mechanism 203 to act, thereby realizing the folding of the frame 201. When the pull strap 100 is loosed, the elastic belt 20 resets and the entire pull strap 100 resets to be in a short state, and the elastic belt 20 and the non-elastic belt 10 are linkedly cooperated so that a length of the pull strap 100 is not too long, thus effectively avoiding the problem that the use is affected due to that the pull strap 100 is too long to fall into the basket 202, drag to the ground or be twisted into the wheels. The pull strap 100 and the child supporter 200 having the pull strap 100 of the present application are simple in structure, convenient to operate, and effectively reduce manufacturing costs.

The foregoing are only the preferred embodiments of the present application, and of course cannot be used to limit the protection scope of the present application. Therefore, equivalent changes made in accordance with the protection scope of the present application still fall within the protection scope of the present application.

What is claimed is:

1. A pull strap for folding a frame of a child supporter, the frame being provided with a folding mechanism that facilitates folding of the frame, the pull strap comprising:
    a non-elastic belt and an elastic belt which are linkedly provided, an end portion of the non-elastic belt is connected to the folding mechanism, and the pull strap is operated to deform the elastic belt, so that the non-elastic belt drives the folding mechanism to actuate the folding of the frame.

2. The pull strap according to claim 1, wherein the non-elastic belt and the elastic belt are correspondingly provided one by one.

3. The pull strap according to claim 1, wherein the pull strap comprises at least two non-elastic belts and at least one elastic belt, and one elastic belt is connected between every two of the non-elastic belts.

4. The pull strap according to claim 1, wherein the non-elastic belt is completely or partially wrapped in the elastic belt and has a receiving length shorter than a natural length of the non-elastic belt, and the non-elastic belt drives the folding mechanism to act when the receiving length is restored to the natural length.

5. The pull strap according to claim 4, wherein the non-elastic belt is in strip profile, the elastic belt is in a cylinder profile, and the non-elastic belt is configured to penetrate through the elastic belt in a clearance fit.

6. The pull strap according to claim 4, wherein the non-elastic belt has at least one receiving portion wrapped in the elastic belt.

7. The pull strap according to claim 6 wherein a relatively middle section of the non-elastic belt penetrates through the elastic belt in a curved profile to have one receiving portion, and both ends of the elastic belt are flush with both ends of the receiving portion.

8. The pull strap according to claim 7, wherein the both ends of the elastic belt and the both ends of the receiving portion are sewn as one piece.

9. The pull strap according to claim 6, wherein relatively front and rear sections of the non-elastic belt penetrate through two corresponding elastic belts in a curved profile to have two receiving portions, and two ends of the two elastic belts are respectively flush with two ends of the corresponding receiving portions.

10. A pull strap for folding a frame of a child supporter, the frame being provided with a folding mechanism that facilitates folding of the frame, the pull strap comprising:
    a non-elastic belt and an elastic belt which are linkedly provided, and end portions of the non-elastic belt and the elastic belt are connected to the folding mechanism, and the pull strap is operated to deform the elastic belt, so that the non-elastic belt drives the folding mechanism to actuate the folding of the frame.

11. The pull strap according to claim 10 wherein the non-elastic belt is completely or partially wrapped in the elastic belt and has a receiving length shorter than a natural length of the non-elastic belt, and the non-elastic belt drives the folding mechanism to act when the receiving length is restored to the natural length.

12. The pull strap according to claim 11, wherein the non-elastic belt is in strip profile and the elastic belt is in a cylinder profile, and the non-elastic belt is configured to penetrate through the elastic belt in a clearance fit.

13. The pull strap according to claim 11 wherein the non-elastic belt has at least one receiving portion wrapped in the elastic belt.

14. The pull strap according to claim 13, wherein the non-elastic belt completely penetrates through the elastic belt in a curved profile to have one receiving portion, and a natural length of the elastic belt is shorter than the natural length of the non-elastic belt, and both ends of the non-elastic belt are flush with both ends of the elastic belt.

15. The pull strap according to claim 14 wherein the both ends of the non-elastic belt and the both ends of the elastic belt are sewn as one piece.

16. The pull strap according to claim 13, wherein relatively front and rear sections of the non-elastic belt penetrate through two corresponding elastic belts in a curved profile and have two receiving portions, wherein both ends of one elastic belt are respectively flush with a leading end of the non-elastic belt and a tailing end of a corresponding receiving portion, and both ends of another elastic belt are respectively flush with a leading end of the corresponding receiving portion and a tailing end of the non-elastic belt.

17. A child supporter, comprising:
 a frame;
 a seat detachably connected to the frame;
 a folding mechanism connected to the frame; and
 a pull strap connected to the folding mechanism, the pull strap comprising a non-elastic belt and an elastic belt which are linkedly provided, an end portion of the non-elastic belt is connected to the folding mechanism, and the pull strap is operated to deform the elastic belt, so that the non-elastic belt drives the folding mechanism to actuate the folding of the frame.

* * * * *